Sept. 3, 1957     J. E. ERICKSON     2,805,082
TRACTOR HITCH
Filed June 22, 1955
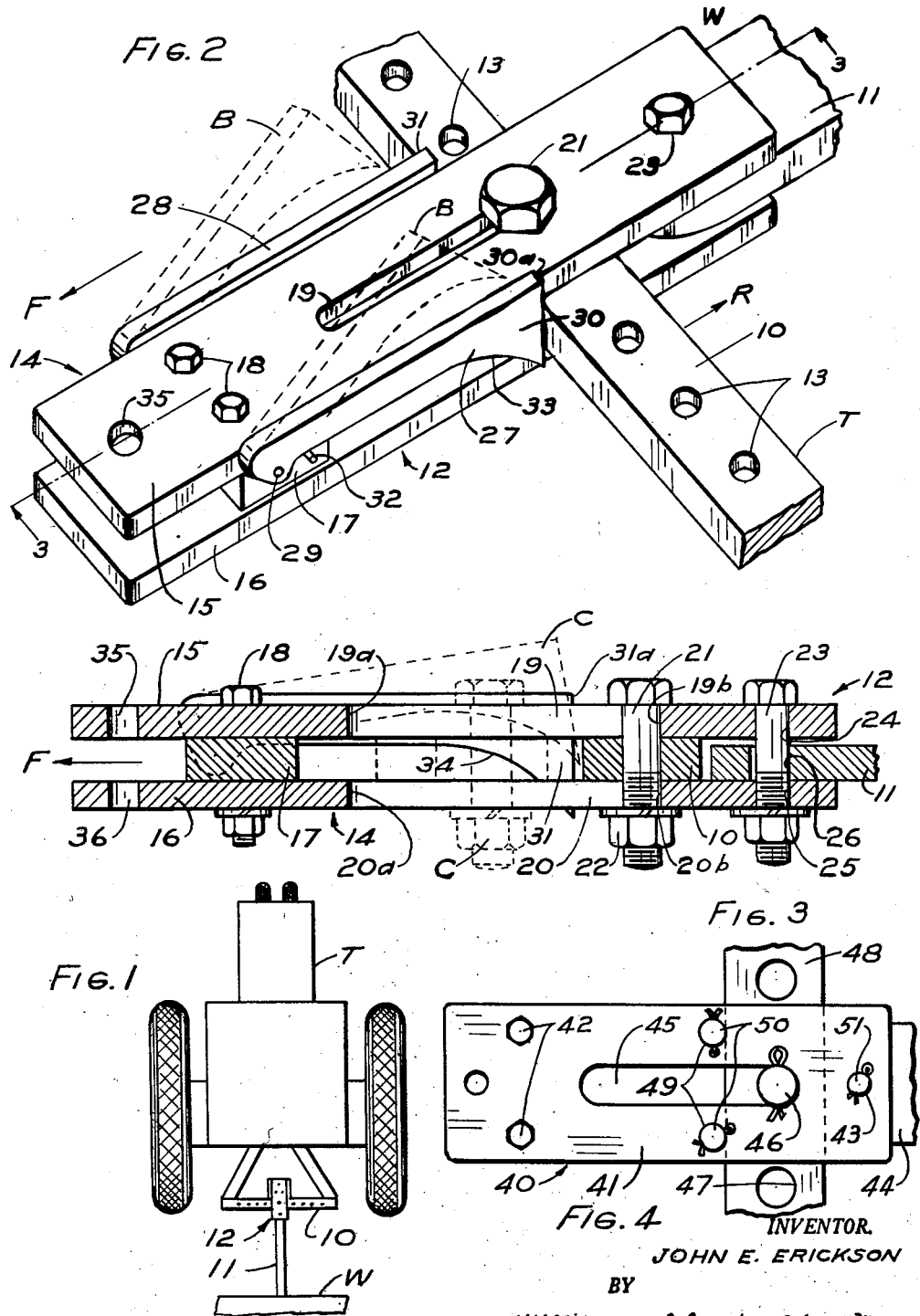

United States Patent Office 2,805,082
Patented Sept. 3, 1957

2,805,082

TRACTOR HITCH

John E. Erickson, East Grand Forks, Minn.

Application June 22, 1955, Serial No. 517,245

5 Claims. (Cl. 280—478)

This invention relates to power equipment accessories and more specifically relates to a hitch for attaching an implement to a tractor.

In the hitching of a tractor to an implement, it is common practice to run the tractor backwards into proximity with the tongue of an implement. It is difficult to precisely align the tractor with the implement tongue so that a connection may be easily made between the tongue and the implement. Implements currently in use are often times of an extremely heavy nature and are therefore difficult to move by manual means. If the tractor is to be positioned precisely in alignment with the implement tongue, a considerable amount of time will be consumed in performing this task.

An object of my invention is to provide a new and improved hitch of simple and inexpensive construction and operation for easily and readily attaching an implement by its tongue to a tractor without necessitating moving the tractor to precisely align it with the implement.

Another object of my invention is the provision of an improved hitch for attachment to a tractor drawbar which is adapted for limited sliding movement relative to the drawbar so that a positive connection to the implement tongue may be made regardless of the precise alignment between the implement and the tractor.

A further object of my invention is to provide an improved tractor hitch adapted for sliding connection to the tractor drawbar so that the tractor may be readily and easily hitched to an implement and which hitch, after the connection is made, will be retained in substantially stationary position relative to the drawbar in order that the operation of the implement may be positively controlled.

These and other objects and advantages of my invention will more fully appear from the following description made in connection with the accompanying drawings wherein like reference characters refer to the same or similar parts throughout the several views and in which:

Fig. 1 is a plan view of a tractor and implement employing the hitch comprising my invention;

Fig. 2 is a perspective view of my invention and showing a portion of the tractor drawbar in detail; and Fig. 3 is a section view taken on a substantially vertical plane at 3—3 of Fig. 2.

Fig. 4 is a plan view of another form of my invention.

The tractor T as shown in Fig. 1 has its transversely extending rigid drawbar 10 attached to the tongue 11 of an implement W such as a wagon by means of the hitch, indicated in general by numeral 12 which comprises my invention.

As best shown in Fig. 2, the transversely extending drawbar 10 of the tractor T has a plurality of apertures 13 spaced along the length thereof.

The hitch 12 is comprised of a clevis indicated in general by numeral 14 which is adapted to be slidably connected to the drawbar 10 of the tractor to permit connection thereof to the tongue 11 of the implement. Clevis 14 includes a pair of elongated and rigid connecting elements or bars 15 and 16 which are disposed in parallel and spaced relation relative to each other. Connecting elements 15 and 16 are maintained in spaced apart relation by a spacer block 17 which is affixed to both of the bars 15 and 16 by means of bolts 18. The spacing between the connecting elements 15 and 16 is sufficient to permit the drawbar 10 to be received therebetween.

Connecting elements 15 and 16 have elongated slots or openings 19 and 20 respectively formed therein and aligned with each other. Pin means are provided for connecting the elements 15 and 16 to the drawbar 10 of the tractor and in the form shown a cap bolt 21 is provided which extends through both of the slots 19 and 20 and through one of the apertures 13 of drawbar 10. Bolt 21 is retained in its position in the elements 15 and 16 and drawbar 10 by means of a nut 22 mounted thereon. Nut 22 will normally be maintained in a slightly loosened condition to prevent the connecting elements 15 and 16 from frictionally gripping drawbar 10 and thereby restricting sliding movement therebetween. Bolt 21 may slide from one end of the slots 19 and 20 to the other end thereof and the end surfaces 19a, 20a, 19b and 20b provide means for limiting the movement of pin or bolt 21, with respect to the clevis 14.

Means are provided for connecting the tongue 11 of the implement W to the rear end portion of the clevis 14 and in the form shown, such means include a removable pin or bolt 23 extending through suitable apertures 24 and 25 respectively provided in alignment with each other in the connecting elements 15 and 16 and the conventional hole 26 provided in the tongue 11.

Means are also provided for holding or retaining the clevis 14 in a certain predetermined position relative to drawbar 10. In the form shown such means include a pair of retaining members or releasable latch members 27 and 28 which are pivotally mounted on opposite sides of the connecting elements 15 and 16 for vertical swinging movement. The latch members 27 and 28 are connected to the spacer block 17, in the form shown, by means of pivots 29. Latch members 27 and 28 extend forwardly and have enlarged foot portions 30 and 31 respectively, which provide rearwardly facing abutment surfaces 30a and 31a which are spaced slightly forwardly of the rear end of the elongated slots 19 and 20 for engaging the drawbar 10 when the clevis 14 is shifted substantially to its limit of forward movement. Latch members 27 and 28 are normally maintained in substantially horizontal and drawbar-retaining position by means of the studs 32 in spacer blocks 17.

Latch members 27 and 28 are provided with downwardly facing camming surfaces 33 and 34 respectively. When the latch members 27 and 28 are in their normal substantially horizontal position, the camming surfaces 33 and 34 are downwardly concave in shape adjacent the enlarged rearward end portions 30 and 31 of the latch members.

In the operation of the hitch 12, the clevis 14 will be attached to the drawbar 10 by inserting the bolt 21 through the slots 19 and 20 of connecting elements 15 and 16 and through one of the apertures 13 in drawbar 10. The tension on nut 22 will be adjusted so as to permit free sliding of the clevis 14 in a direction transversely of the drawbar 10 and also to permit free swinging of the clevis 14 about bolt 21. When it is desired to connect the implement W to the tractor T, the tractor will be driven in a reverse direction so as to bring the drawbar 10 and the hitch 14 into immediate proximity with the tongue 11 of the implement W. The latch members 27 and 28 will be raised substantially into their dotted position B as shown in Fig. 2 wherein the clevis 14 may be freely shifted forwardly and rearwardly across the drawbar 10. The clevis 14 will be shifted rearwardly so as to bring the apertures 24 and 25 thereof into proximity with the end of the tongue 11 and will be swung to one side or the other so as to align the apertures 24 and 25 with the hole 26 in tongue 11. The pin or bolt 23 will thereupon be inserted and secured in position to hold the tongue 11 in the clevis 14. When the clevis 14 is shifted rearwardly so as to attach it to the tongue 11, the bolt 21 will effectively slide forwardly in the slots 19 and 20 and may assume the dotted position C as shown in Fig. 3. Of course the drawbar 10 is maintained in substantially fixed position with respect to the bolt 21 and this also is effectively moved forwardly of the clevis 14. The camming surfaces 33 and 34 of the latch members 27 and 28 respectively will engage and ride on the upper surface of the drawbar 10. The abutment surfaces 30a and 31a of the latch members 27 and 28 respectively are maintained out of abutting relation with drawbar 10.

After the connection between the clevis 14 and the tongue 11 has been made, the tractor T will then be driven a little further in a reverse direction as indicated by the arrow R in Fig. 2 so as to drive the drawbar 10 rearwardly with respect to the clevis 14. As the drawbar approaches its rearward limit of shifting relative to clevis 14 which is defined by the striking of bolt 21 against the rear surfaces 19b and 20b of slots 19 and 20, the latch members 27 and 28 will fall from their dotted position C as shown in Fig. 3 into the full line position thereof. The abutment surfaces 30a and 31a of latch members 27 and 28 will thereupon be in position to engage and restrict relative movement between clevis 14 and drawbar 10. When the tractor T is thereafter driven forwardly in the direction of arrow F, the abutment surfaces 30a and 31a of latch members 27 and 28 will engage the drawbar 10 to restrict relative movement therebetween and to thereby restrict movement between the tongue 11 of the implement W and the drawbar 10 of tractor T. It should be noted that the tongue 11 is free to swing about the pin 23 as the tractor and implement move along the ground.

The form of the invention shown in Fig. 4 is substantially the same in its operating principle as the form shown in Figs. 1 and 2. The clevis indicated in general by numeral 40 is provided with spaced upper and lower rigid connecting elements 41 which are interconnected by bolts 42 and which are provided at the rear end portion thereof with aligned apertures 43 for connecting the clevis to the tongue 44 of an implement. The connecting elements 41 are also provided with aligned and elongated openings or slots 45. A pin 46 is removably inserted through the slot 45 and also inserted through one of the apertures 47 in the tractor drawbar 48. In this form of the invention a pair of apertures 49 are provided in each of the upper and lower connecting elements 41 in alignment with each other adjacent the rearward end portion of the slot 45. Retaining members 50, which in the form shown comprise rigid pins are inserted in the apertures 49 for engaging and retaining the drawbar and pin 46 adjacent the rearward end of the slot 45.

The operation of the form of the invention shown in Fig. 4 is substantially the same as the operation of the form of the invention shown in Figs. 2 and 3. In this form of the invention the retaining members 49 may be removed when the clevis 40 is to be shifted forwardly or rearwardly with respect to the tractor drawbar 48 and when the clevis is to be swung into a position whereby the removable pin 51 may be inserted through the aligned apertures 43 and the aperture in the implement tongue 44. The tractor will again be driven in a reverse direction until the pin 46 reaches its rearward limit of travel in slot 45 whereupon the pins 50 will be inserted into apertures 49 is shifted rearwardly so as to provide a substantially rigid but swingable connection between the tractor and implement.

I also provide a pair of aligned apertures 35 and 36 at the forward portion of the connecting members 15 and 16 to provide means for attaching the clevis 14 to a swinging drawbar of a tractor.

It will be seen that I have provided a new and improved hitch for connecting a power implement such as a tractor to an implement for performing work, which hitch is extremely simple to operate, but which facilitates the ready and easy connection of the tractor to the implement even though the tractor is not precisely aligned with the implement tongue.

It should also be noted that I have provided a novel hitch which is slidable and swingable with respect to the tractor drawbar to which it is connected for easy attachment to an implement tongue and which hitch provides a secure and substantially rigid connection between the tractor and the implement after the connection is made.

It will, of course, be understood that various changes may be made in the form, detail, arrangement and proportion of the parts without departing from the scope of my invention which consists of the matter described herein and set forth in the appended claims.

What is claimed is:

1. A hitch for attaching the tongue of an implement to a tractor drawbar comprising a rigid connecting element, said element having a rear portion with means for connecting the same to such an implement and having a front portion, means for slidably connecting said element to such a drawbar and permitting limited forward and rearward movement thereof transversely of the drawbar, a releasable latch member mounted on said connecting element and having an abutment surface facing rearwardly adjacent the rearward limit of sliding movement of said connecting element for engaging the drawbar and thereby holding the connecting element in stationary position relative to the drawbar, whereby said latch member may be released to permit said connecting element to be moved and positioned for connection to the tongue of such an implement proximate to the drawbar.

2. A hitch for attaching an implement to a tractor drawbar, comprising an elongated rigid connecting element having a rear portion with means for connection to such an implement and having a forward portion, means for slidably connecting said element to such a drawbar and permitting limited forward and rearward movement thereof transversely of the drawbar, a releasable latch member shiftably mounted on said connecting element for movement into and out of retaining and releasing positions and having an abutment surface facing rearwardly for engaging the drawbar and holding the connecting element in a substantially stationary position adjacent its limit of forward movement relative to the drawbar, and said latch member having a camming surface for engagement with the drawbar when said latch member is shifted to releasing position to permit free movement of the connecting element relative to the drawbar and guiding said latch member into retaining position, whereby said connecting element member may be freely moved relative to the drawbar to be positioned for connection to such an implement and said camming surface will shift said latch member into retaining position to hold the drawbar and connecting element in stationary position relative to each other.

3. A hitch for attaching an implement to a tractor drawbar, comprising an elongated rigid connecting element having a rear portion with means for connection to such an implement and having a forward portion, means for slidably connecting said element to such a drawbar for permitting forward and rearward movement thereof transversely of the drawbar, said element having front and rear limits restricting sliding thereof, an elongated latch member pivotally mounted on said connecting element for vertical swinging and normally extending rearwardly thereof, said latch member having a rearwardly facing abutment surface spaced from the rear limit of said element for retaining the drawbar therebetween and said latch member having a downwardly facing camming surface adjacent said abutment surface for riding over said drawbar when said latch member is swung upwardly and said connecting element is shifted relative to the drawbar for maintaining said abutment surface out of abutting engagement with said drawbar, whereby said connecting element may be shifted freely between said limits and said camming surface will permit said abutment surface to engage the drawbar when the drawbar is shifted into proximity with the rear limit of said connecting element.

4. A hitch for attaching the tongue of an implement to an apertured tractor drawbar, comprising an elongated rigid connecting element having a rear portion with means for connection to such a tongue, said connecting element having an elongated slot therein extending longitudinally thereof, pin means passing through said slot for connection to the drawbar in one of the apertures thereof to permit swinging and limited sliding movement of said connecting element relative to the drawbar, and a releasable latch member mounted on said connecting element for engaging said drawbar and holding said element at one of its limits of sliding movement, whereby when the latch member is released said connecting element may be shifted across the drawbar and swung into position for connection to such a tongue.

5. A hitch for attaching the tongue of an implement to an apertured tractor drawbar, comprising a clevis including a pair of interconnected and juxtaposed connecting elements spaced apart to slidably receive the drawbar therebetween and having aligned and elongated slots extending longitudinally thereof, pin means passing through said slots for connection to the drawbar in one of the apertures thereof to permit swinging and limited sliding movement of said connecting elements relative to the drawbar, said elements having rear end portions with means for attachment to such an implement tongue, a pair of latch members pivotally mounted for vertical swinging on said clevis and having rearwardly facing abutment surfaces for engaging said drawbar and holding the same substantially stationary relative to said clevis when said clevis is shifted to its forward limit of movement relative to the drawbar, and means for restricting swinging of said latch members and to maintain the same in abutting relation with the drawbar.

References Cited in the file of this patent

UNITED STATES PATENTS

| | | |
|---|---|---|
| 2,036,993 | Allen | Apr. 14, 1936 |
| 2,717,163 | Martin | Sept. 6, 1955 |

FOREIGN PATENTS

| | | |
|---|---|---|
| 354,052 | Germany | May 29, 1922 |